(No Model.)
G. KINGSTON.
WIRE HOOK.
No. 493,626.        Patented Mar. 14, 1893.
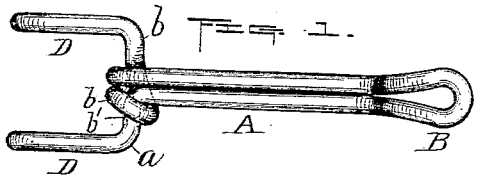
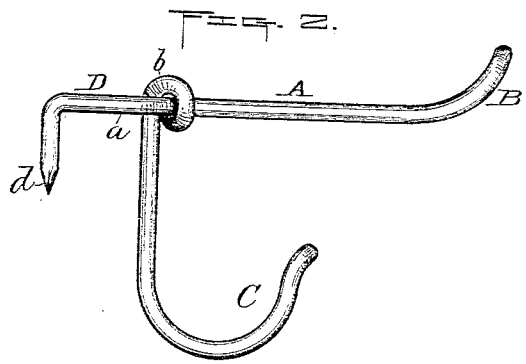
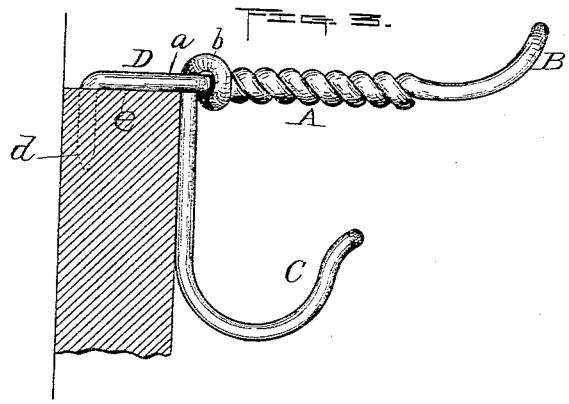
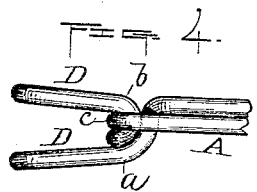
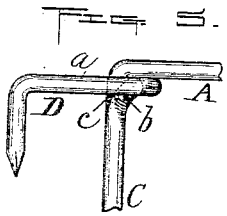
Witnesses;
W. B. Nourse.
C. Forrest Wesson.
Inventor;
George Kingston
By A. A. Barker Att'y

UNITED STATES PATENT OFFICE.

GEORGE KINGSTON, OF WORCESTER, MASSACHUSETTS.

WIRE HOOK.

SPECIFICATION forming part of Letters Patent No. 493,626, dated March 14, 1893.

Application filed April 10, 1891. Serial No. 388,413. (No model.)

*To all whom it may concern:*

Be it known that I, GEORGE KINGSTON, of the city and county of Worcester and State of Massachusetts, have invented certain new and useful Improvements in Wire Coat and Hat Hooks; and I do hereby declare that the following is a full, clear, and exact description thereof, reference being had to the accompanying drawings, forming a part of this specification, and in which—

Figure 1 represents a top or plan view of my aforesaid improved hook. Fig. 2 is a side view thereof. Fig. 3 is a similar side view showing the hook applied to a strip of wood, as in use, and also a modification in the construction hereinafter described, and Figs. 4 and 5 represent similar views to Figs. 1 and 2, of part of a hook showing another modification, also hereinafter described.

My invention relates to coat and hat hooks made from a single piece of wire bent into the proper form to produce the hook, and more particularly to double hooks.

The purpose of my invention is to provide a hook which may be securely and quickly fastened to the wooden hook-strip without the use of screws and without danger of cracking the plastering of the wall when driving the fastening prongs of the hook into the hook strip.

To this end my invention consists in a wire hook of the construction hereinafter fully described and as set forth in the claim of this specification.

In order that others may better understand the nature and purpose of my said invention, I will now proceed to describe it more in detail.

In the drawings A represents the shank, B the upper hook which constitutes the outer end or continuation of said shank, C the bottom hook which is extended down and forward from the base or inner end of said shank, and D D the angular prongs before alluded to, which project rearwardly a short distance about upon a line with the shank and then down at about right angles thereto, and are provided at their extremities with pointed ends adapted to be driven into the wood in fastening the hook in position as hereinafter specified.

In constructing the hook the wire is doubled along the whole length of the parts constituting the upper and lower hooks and shank, with the ends of the wire in said formation terminating beyond the juncture of the shank and lower hook, sufficient length of wire being allowed at said ends to produce the angular prongs D D, and to bend the wire at the inner ends of the prongs so as to hold the doubled wires of the hook in position.

In the hook shown in Figs. 1, 2 and 3, the end $a$, constituting a continuation of one of the shank wires, is bent laterally and horizontally extending out but a short distance, then at right angles rearwardly a little longer distance, and finally downwardly at right angles thus forming one of the pointed prongs D. The other end $b$ of the wire which extends up from the lower hook passes up back of the laterally projecting part $b'$ of the other end, thence over said laterally projecting part and down under the two shank wires, thence laterally about the same distance and in an opposite direction to the other end $a$, thence rearwardly and down to form the other pointed prong D, both prongs being substantially in line, horizontally, with the shank A, as previously stated. In the construction shown in Figs. 4 and 5 the end $a$ is first passed laterally under the other or main shank wire then rearward and down to produce one of said prongs, and the other end $b$ crosses laterally in the opposite direction under the end $a$ between its lateral projection $a'$ and the main wire $c$ of the lower hook, also under the aforesaid main shank wire, then rearwardly and down to produce the other prong. It will be understood that in bending the wires as aforesaid to produce said prongs they are also in practice preferably bent in curved form sufficiently to bring the wires on a level laterally: that is, one wire being bent around another a sufficient distance to bring the shank wires as well as the two prongs upon a level.

If desired, the wires of the shank may be intertwisted as shown in Fig. 3 to fasten said wires together and thus stiffen said shank.

In fastening the hook in position for use, it is placed with the back of the lower hook against the wood strip to which it is to be secured, and the points of the prongs against the top edge thereof, then, holding the hook with one hand, and a hammer in the other the vertical pointed ends $d\ d$ of the prongs are driven into the wood so that the horizontal portions $e\ e$ will lie upon or be partially embedded in the surface thereof.

The operation, it will at once be apparent, may be very easily and expeditiously performed, and the hook when thus fastened with the back of the bottom hook against the support and the ends $d\ d$ driven into the top thereof is held in a very secure and perfect manner. It is held more securely than by the use of an ordinary straight drive-point, and considerable expense and time is saved by dispensing with the usual screws or other separate fastenings commonly used.

I am aware of the United States patent to C. C. Pierce, No. 377,772, dated February 14, 1888, for improvements in wire hooks and make no claim to the construction covered therein.

Having now described my invention, what I claim therein as new, and desire to secure by Letters Patent, is—

A coat and hat hook consisting of a single piece of wire and comprising the shank A, of doubled wire, having the hook B at its outer end, the bottom hook C formed from a continuation of said doubled wire shank, and the two separated prongs D at the top portion of said hook and formed from the two end portions of the wire bent outward at the rear portion of the said shank, said prongs being provided with the downwardly projecting pointed drive ends $d$.

GEORGE KINGSTON.

Witnesses:
A. A. BARKER,
W. B. NOURSE.